United States Patent
Jiang

(10) Patent No.: US 9,526,052 B2
(45) Date of Patent: Dec. 20, 2016

(54) CELL RESELECTION METHOD AND APPARATUS, BASE STATION

(71) Applicant: ZTE Corporation, Shenzhen, Guangdong (CN)

(72) Inventor: Bo Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 87 days.

(21) Appl. No.: 14/442,312

(22) PCT Filed: Aug. 22, 2013

(86) PCT No.: PCT/CN2013/082090
§ 371 (c)(1),
(2) Date: May 12, 2015

(87) PCT Pub. No.: WO2014/079243
PCT Pub. Date: May 30, 2014

(65) Prior Publication Data
US 2016/0112915 A1    Apr. 21, 2016

(30) Foreign Application Priority Data
Nov. 21, 2012 (CN) .......................... 2012 1 0476569

(51) Int. Cl.
*H04W 4/00* (2009.01)
*H04W 36/08* (2009.01)
(Continued)

(52) U.S. Cl.
CPC ............ *H04W 36/08* (2013.01); *H04W 36/24* (2013.01); *H04W 36/30* (2013.01); *H04W 36/0083* (2013.01); *Y02B 60/50* (2013.01)

(58) Field of Classification Search
None
See application file for complete search history.

(56) References Cited

U.S. PATENT DOCUMENTS

2007/0049325 A1* 3/2007 Lee .................. H04W 36/04
                                                                    455/525
2009/0213812 A1   8/2009 Park
(Continued)

FOREIGN PATENT DOCUMENTS

CN   101795477 A   8/2010
CN   101980569 A   2/2011
(Continued)

OTHER PUBLICATIONS

Supplementary European Search Report in European application No. 13856428.1, mailed on Nov. 26, 2015.
(Continued)

*Primary Examiner* — Otis L Thompson, Jr.
(74) *Attorney, Agent, or Firm* — Oppedahl Patent Law Firm LLC

(57) ABSTRACT

Disclosed are a cell reselection method, comprising: when a source cell determines that a UE meets an initial reselection condition of reselecting a target cell, the source cell performing a local search to find whether a reselection threshold parameter of reselecting the source cell from the target cell exists, if not, reselecting the target cell for the UE, and if yes, further determining whether a corresponding parameter of the UE in the source cell is smaller than or equal to the reselection threshold parameter, if not, not reselecting the target cell for the UE, and if yes, reselecting the target cell for the UE. Further disclosed are a cell reselection apparatus and a base station. The technical solution of the present invention avoids asymmetry of reselection policy between a TD cell and a GSM cell, avoids pingpong reselection between the TD cell and the GSM cell, shortens the duration that the paging of a VE is off during reselection, reduces the network load, and making the VE energy conservative.

12 Claims, 4 Drawing Sheets

(51) Int. Cl.
*H04W 36/24* (2009.01)
*H04W 36/30* (2009.01)
*H04W 36/00* (2009.01)

(56) References Cited

U.S. PATENT DOCUMENTS

| | | | |
|---|---|---|---|
| 2010/0081438 A1 | 4/2010 | Callender | |
| 2010/0304745 A1* | 12/2010 | Patel | H04W 52/143 455/435.1 |
| 2011/0250888 A1 | 10/2011 | Ryu | |
| 2011/0292821 A1* | 12/2011 | Chin | H04W 36/0066 370/252 |
| 2012/0088499 A1* | 4/2012 | Chin | H04W 24/10 455/426.1 |
| 2012/0122458 A1 | 5/2012 | Jokinen | |
| 2012/0135739 A1 | 5/2012 | Paterson | |
| 2012/0147850 A1* | 6/2012 | Zheng | H04W 48/16 370/331 |
| 2013/0021929 A1* | 1/2013 | Kim | H04B 7/024 370/252 |
| 2013/0070679 A1 | 3/2013 | Wegmann | |
| 2013/0244657 A1* | 9/2013 | Wang | H04W 36/24 455/436 |
| 2014/0038607 A1* | 2/2014 | Makharia | H04W 36/0011 455/436 |
| 2014/0187243 A1* | 7/2014 | Rune | H04W 36/26 455/436 |
| 2014/0242993 A1* | 8/2014 | Dahlen | H04W 36/30 455/436 |
| 2014/0315555 A1* | 10/2014 | Zhang | H04W 36/0094 455/437 |
| 2014/0378142 A1* | 12/2014 | Xuan | H04W 36/0088 455/437 |
| 2015/0056996 A1* | 2/2015 | Chou | H04W 36/0088 455/436 |
| 2016/0142953 A1* | 5/2016 | Chou | H04W 36/04 455/436 |

FOREIGN PATENT DOCUMENTS

| | | |
|---|---|---|
| CN | 102098753 A | 6/2011 |
| CN | 102196516 A | 9/2011 |
| CN | 102572984 A | 7/2012 |
| CN | 103024839 A | 4/2013 |
| GB | 2472596 A | 2/2011 |
| JP | 2013502083 A1 | 1/2013 |
| WO | 2009102161 A2 | 8/2009 |
| WO | 2009133242 A1 | 11/2009 |
| WO | 2011019083 A1 | 2/2011 |
| WO | 2011070643 A1 | 6/2011 |
| WO | 2011131225 A1 | 10/2011 |

OTHER PUBLICATIONS

Evolved Universal Terrestrial Radio Access (E-UTRA),mailed on Sep. 2012.
Avoiding unnecessary handovers in inter-RAT environment,mailed on Nov. 2010.
International Search Report in international application No. PCT/CN2013/082090, mailed on Nov. 28, 2013.
English Translation of the Written Opinion of the International Search Authority in international application No. PCT/CN2013/082090, mailed on Nov. 28, 2013.

* cited by examiner

CELL RESELECTION METHOD AND APPARATUS, BASE STATION

TECHNICAL FIELD

The disclosure relates to cell reselection, and in particular to a method and apparatus for cell reselection between two different mobile communication systems, and a base station BS.

BACKGROUND

Cell reselection by a User Equipment UE in a Public Land Mobile Network PLMN between a Time Division-Synchronous Code Division Multiple Access TD-SCDMA system and a Global System of Mobile communication GSM is protocoled.

Serving cell reselection by a UE from the TD-SCDMA system to the GSM is protocoled to be performed according to sorted relative values. Namely, when the signal of a GSM cell is better than that of a serving TD-SCDMA system cell over a continued period of time according to a sorting criterion, cell reselection towards the GSM may be triggered.

Reselection from the TD-SCDMA system to the GSM however depends on an absolute threshold. When a UE camping on the GSM leans by measurement that the signal strength of a TD-SCDMA system cell is higher than the threshold for a continued period of 5 s, cell reselection towards the TD-SCDMA system may be triggered.

It may be understood from the simple description of inter-standard reselection that, due to asymmetric principles in reselection between the GSM and the TD-SCDMA system, there may be chances when both a reselection requirement from a TD-SCDMA system cell to a GSM cell and that from a GSM cell to a TD-SCDMA system cell are met, which may lead to Ping-Pong reselection and thus cause a series of problems as follows, for example. As a UE may receive no paging message during reselection, Ping-Pong reselection may lead to increased paging interruption time. Registration has to be performed after reselection, which no doubt increases a network load, and will lead to UE resource waste, leading to a shortened standby time.

SUMMARY

In view of this, embodiments herein provide a method and apparatus for cell reselection as well as a BS, capable of suppressing Ping-Pong reselection between two cells of different communication systems.

To this end, herein a technical solution may be implemented as follows.

A method for cell reselection may include:

when determining that a User Equipment UE being served in a source cell meets an initial reselection condition for reselecting to be served in a target cell, locally searching for a source cell reselection parameter threshold for a UE being served in the target cell to reselect to be served in the source cell; when there is no such threshold, allowing the UE being served in the source cell to reselect to be served in the target cell; when there is such a threshold, further determining whether a source cell reselection parameter corresponding to the source cell reselection parameter threshold measured for the source cell by the UE is less than or no greater than the source cell reselection parameter threshold; when the source cell reselection parameter is less than or no greater than the source cell reselection parameter threshold, allowing the UE being served in the source cell to reselect to be served in the target cell.

The method may further include:

in allowing the UE being served in the source cell to reselect to be served in the target cell, notifying the target cell of a target cell reselection parameter threshold for the UE being served in the source cell to reselect to be served in the target cell.

The initial reselection condition may include a protocoled reselection condition.

The source cell and the target cell may belong respectively to different communication systems.

The source cell and the target cell may belong respectively to a Time Division-Synchronous Code Division Multiple Access TD-SCDMA system and a Global System of Mobile communication GSM.

When the source cell is a GSM cell and the target cell is a TD-SCDMA system cell, the target cell may be notified of a source cell identifier and a target cell reselection parameter threshold.

When the source cell is a TD-SCDMA system cell and the target cell is a GSM cell, the target cell may be notified of a source cell identifier, a target cell identifier, and a target cell reselection parameter threshold.

The source cell reselection parameter threshold may include at least one of a Signal-to-Noise Ratio SNR and a received power of a wireless signal.

An apparatus for cell reselection may include a first determining unit, a search unit, a reselecting unit, and a second determining unit.

The first determining unit may be configured for: determining whether a User Equipment UE being served in a source cell meets an initial reselection condition for reselecting to be served in a target cell; when the UE being served in the source cell meets the initial reselection condition for reselecting to be served in the target cell, triggering the search unit.

The search unit may be configured for: locally searching for a source cell reselection parameter threshold for a UE being served in the target cell to reselect to be served in the source cell; when there is no such threshold, triggering the reselecting unit; when there is such a threshold, triggering the second determining unit.

The reselecting unit may be configured for: allowing the UE being served in the source cell to reselect to be served in the target cell.

The second determining unit may be configured for: determining whether a source cell reselection parameter corresponding to the source cell reselection parameter threshold measured for the source cell by the UE is less than or no greater than the source cell reselection parameter threshold; when the source cell reselection parameter is less than or no greater than the source cell reselection parameter threshold, triggering the reselecting unit to allow the UE being served in the source cell to reselect to be served in the target cell.

The apparatus may further include a notification unit.

The notification unit may be configured for: when the reselecting unit allows the UE being served in the source cell to reselect to be served in the target cell, notifying the target cell of a target cell reselection parameter threshold for the UE being served in the source cell to reselect to be served in the target cell.

The initial reselection condition may include a protocoled reselection condition.

The source cell and the target cell may belong respectively to different communication systems.

The source cell reselection parameter threshold may include at least one of a Signal-to-Noise Ratio SNR and a received power of a wireless signal.

The source cell and the target cell may belong respectively to a Time Division-Synchronous Code Division Multiple Access TD-SCDMA system and a Global System of Mobile communication GSM.

The notification unit may be further configured for: when the source cell is a GSM cell and the target cell is a TD-SCDMA system cell, notifying the target cell of a source cell identifier and a target cell reselection parameter threshold.

Or the notification unit may be further configured for: when the source cell is a TD-SCDMA system cell and the target cell is a GSM cell, notifying the target cell of a source cell identifier, a target cell identifier, and a target cell reselection parameter threshold.

A base station BS may include the apparatus for cell reselection.

According to embodiments herein, when it is determined that a UE being served in a source cell meets an initial reselection condition for reselecting to be served in a target cell, local search is performed for a source cell reselection parameter threshold for a UE being served in the target cell to reselect to be served in the source cell; when there is no such threshold, the UE being served in the source cell reselects to be served in the target cell; when there is such a threshold, it is further determined whether a source cell reselection parameter corresponding to the source cell reselection parameter threshold measured for the source cell by the UE is less than or no greater than the source cell reselection parameter threshold; when the source cell reselection parameter is greater than the source cell reselection parameter threshold, the UE being served in the source cell does not reselect to be served in the target cell; when the source cell reselection parameter is less than or no greater than the source cell reselection parameter threshold, the UE being served in the source cell reselects to be served in the target cell. The initial reselection condition is a reselection condition specified in a protocol related to the reselection. With the disclosure, a target cell may be notified of a reselection parameter threshold used in reselection to the target cell by a US from a source cell, such that before reselection toward the source cell by the UE from the target cell, it may be further determined whether to carry out the reselection toward the source cell according to the reselection parameter threshold for reselection to the target cell. With a technical solution herein, asymmetric strategies for reselection between a TD-SCDMA system cell (TD cell for short) and a GSM cell, avoiding Ping-Pong reselection between the TD cell and the GSM cell, shortening UE paging interruption time during reselection, reducing a network load, enabling UE energy saving.

DETAILED DESCRIPTION

Figure 1:
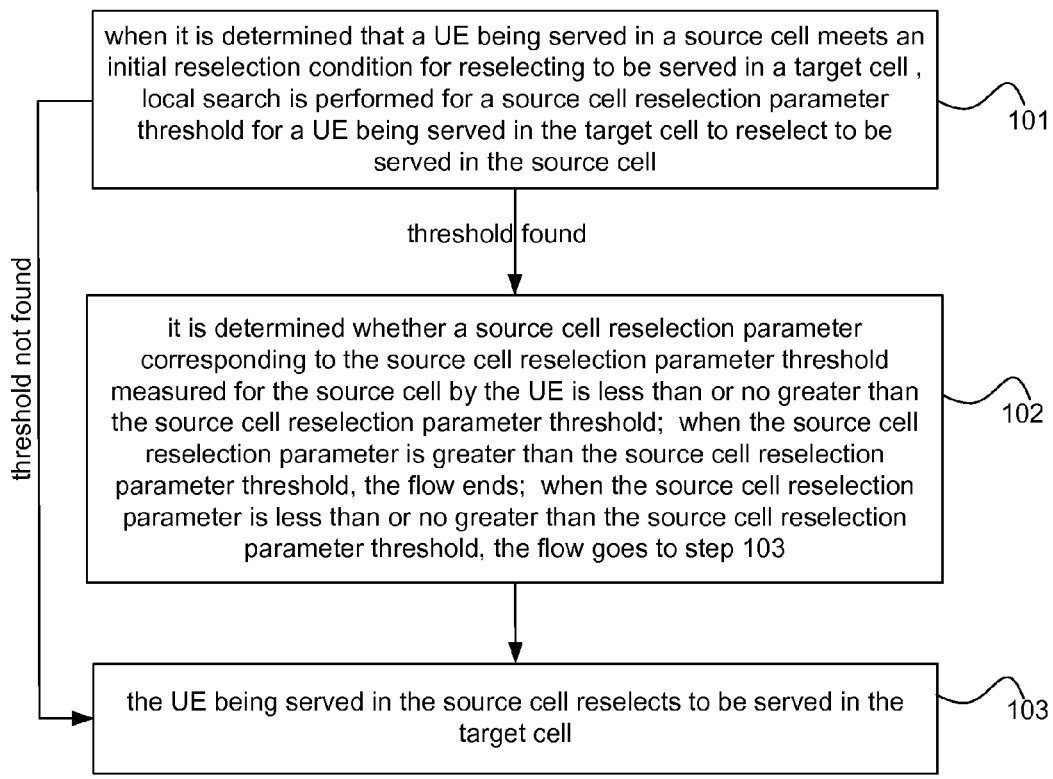
FIG. 1 is a flowchart of a method for cell reselection according to an embodiment herein.

According to embodiments herein, when it is determined that a UE being served in a source cell meets an initial reselection condition for reselecting to be served in a target cell, local search is performed for a source cell reselection parameter threshold for a UE being served in the target cell to reselect to be served in the source cell; when there is no such threshold, the UE being served in the source cell reselects to be served in the target cell; when there is such a threshold, it is further determined whether a source cell reselection parameter corresponding to the source cell reselection parameter threshold measured for the source cell by the UE is less than or no greater than the source cell reselection parameter threshold; when the source cell reselection parameter is greater than the source cell reselection parameter threshold, the UE being served in the source cell does not reselect to be served in the target cell; when the source cell reselection parameter is less than or no greater than the source cell reselection parameter threshold, the UE being served in the source cell reselects to be served in the target cell.

With a technical solution according to an embodiment herein, reselection parameter thresholds between a TD cell and a GSM cell are shared, thereby avoiding inter-cell Ping-Pong reselection due to inconsistent protocoled strategies. In reselection from a GSM cell to a TD cell, the TD cell is notified of a reselection parameter threshold for reselection from a GSM cell to a TD cell (that is, a TD cell reselection parameter threshold for a UE being served in a GSM cell to reselect to be served in a TD cell). When cell reselection assessment is performed in the serving TD cell, in assessment of a previous serving GSM cell, besides a usual criterion for reselection from a TD cell to a GSM cell, further determination is performed based on the reselection parameter threshold for reselection from a GSM cell to a TD cell. When the parameter corresponding to the wireless signal of the serving TD cell is greater than the reselection parameter threshold for reselection from a GSM cell to a TD cell, reselection toward the previous serving GSM cell will not be performed. Otherwise when the parameter corresponding to the wireless signal of the serving TD cell is less or no greater than the reselection parameter threshold for reselection from a GSM cell to a TD cell, reselection toward the previous serving GSM cell will be performed. Likewise, in reselection from a TD cell to a GSM cell, the GSM cell is notified of a reselection parameter threshold for reselection from a TD cell to a GSM cell (that is, a GSM cell reselection parameter threshold for a UE being served in a TD cell to reselect to be served in a GSM cell). When cell reselection assessment is performed in the serving GSM cell, in assessment of a previous serving TD cell, besides a usual criterion for reselection from a GSM cell to a TD cell, further determination is performed based on the assessment criterion within the TD standard to increase reliability in reselection and avoid Ping-Pong reselection.

To clearly show a technical problem to be solved, a technical solution, and beneficial effects of the present disclosure, the present disclosure is further elaborated below with reference to the drawings and embodiments.

FIG. 1 is a flowchart of a method for cell reselection according to an embodiment herein. As shown in FIG. 1, a method for cell reselection according to an embodiment herein may include steps as follows.

In step 101, when it is determined that a UE being served in a source cell meets an initial reselection condition for reselecting to be served in a target cell, local search is performed for a source cell reselection parameter threshold for a UE being served in the target cell to reselect to be served in the source cell; when there is no such threshold, the flow continues by executing step 103; when there is such a threshold, the flow continues by executing step 102.

The initial reselection condition is a reselection condition specified in a protocol related to the reselection.

A reselection parameter threshold may include at least one of a Signal-to-Noise Ratio SNR and a received power of a wireless signal. A reselection parameter threshold may be configured as a wireless signal quality indicator. Not limited to the two parameters in embodiments herein, a reselection parameter threshold may further include a parameter such as a Received Signal Strength Indicator RSSI, etc. Alternatively, the reselection parameter threshold may also be a composite index determined based on the multiple received signal quality parameters.

In step 102, it is determined whether a source cell reselection parameter corresponding to the source cell reselection parameter threshold measured for the source cell by the UE is less than or no greater than the source cell reselection parameter threshold; when the source cell reselection parameter is greater than the source cell reselection parameter threshold, the flow ends; when the source cell reselection parameter is less than or no greater than the source cell reselection parameter threshold, the flow goes to step 103.

When the source cell reselection parameter is greater than the source cell reselection parameter threshold, it means that the UE detects a wireless signal of better quality in the source cell, and reselection toward the target cell may then cause later reselection to the source cell by the UE from the target cell, thereby leading to Ping-Pong reselection. In this case, it's better that the UE is not allowed to reselect to be served in the target cell.

In step 103, the UE being served in the source cell reselects to be served in the target cell.

When the UE being served in the source cell reselects to be served in the target cell, the target cell may be notified, from the source cell, of a target cell reselection parameter threshold for the UE being served in the source cell to reselect to be served in the target cell.

The source cell and the target cell may belong respectively to different communication systems.

The source cell and the target cell may belong respectively to the TD-SCDMA system and the GSM.

When the source cell is a GSM cell and the target cell is a TD-SCDMA system cell, the target cell may be notified of a source cell identifier and a target cell reselection parameter threshold.

When the source cell is a TD-SCDMA system cell and the target cell is a GSM cell, the target cell may be notified of a source cell identifier, a target cell identifier, and a target cell reselection parameter threshold.

Figure 2:
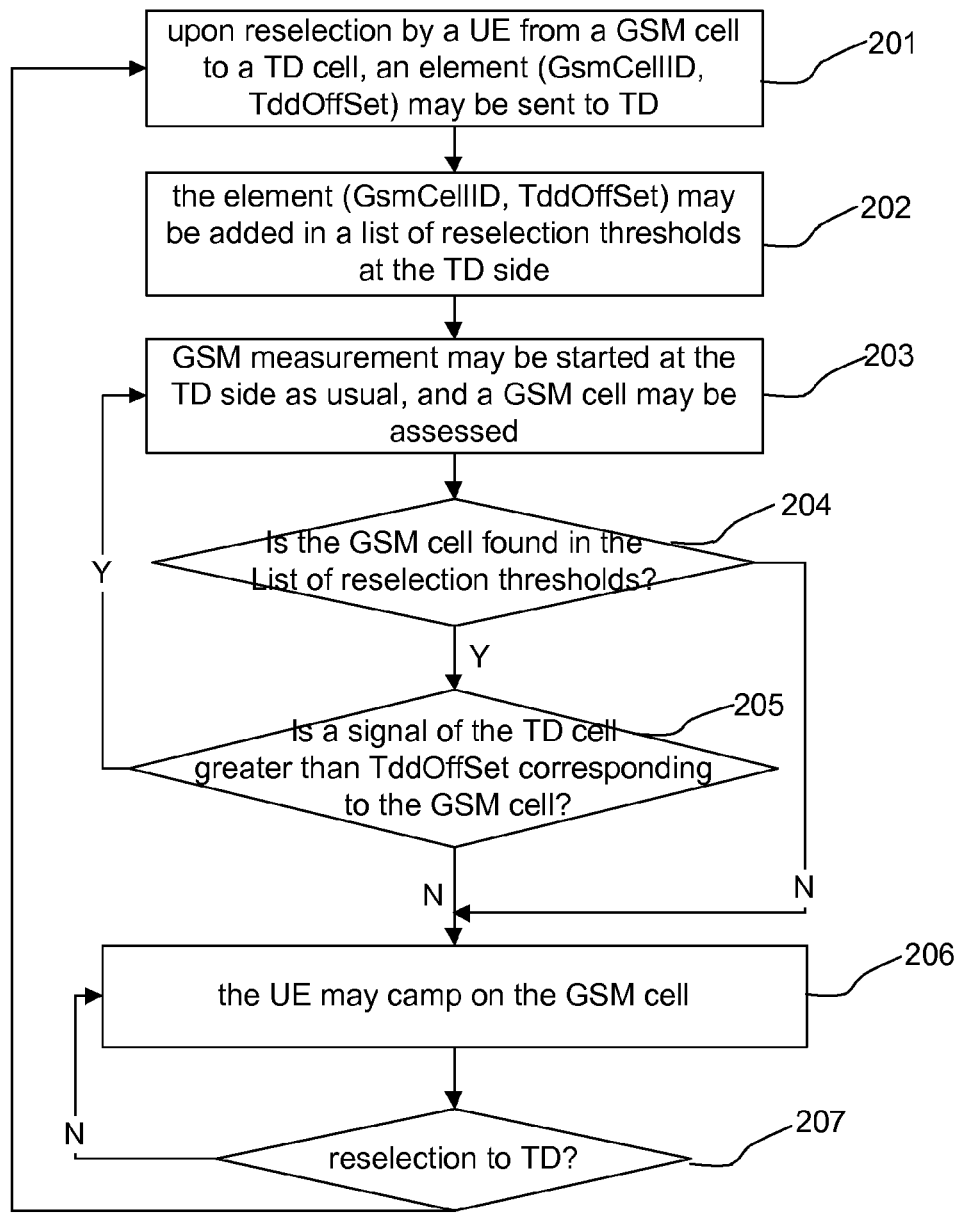
FIG. 2 is a flowchart of suppressing reselection from a TD cell to a GSM cell according to an embodiment herein.

FIG. 2 is a flowchart of suppressing reselection from a TD cell to a GSM cell according to an embodiment herein. As shown in FIG. 2, the TD cell may maintain a list of reselection parameter thresholds including elements in a format of (GSMCellID, TddOffSet). The GSMCellID denotes the cell identifier of a GSM cell. The TddOffSet denotes a reselection parameter threshold for reselection toward TD from the GSM cell. For example, the reselection parameter threshold may be parameters such as an SNR and a received power of a wireless signal, a RSSI, etc. Alternatively, the reselection parameter threshold may also be a composite index determined based on the multiple received signal quality parameters. Assuming that a UE is camping on the GSM cell, the suppressing reselection from the TD cell to the GSM cell may include steps as follows.

In step 201, upon reselection by a UE from a GSM cell to a TD cell, an element (GsmCellID, TddOffSet) may be sent to the TD side. The GSMCellID is the cell identifier of the GSM cell serving the UE before the reselection. The TddOffSet is the reselection parameter threshold for the reselection.

In step 202, the element (GsmCellID, TddOffSet) may be added in a list of reselection parameter thresholds at the TD side; meanwhile, a timer is started for the element.

In step 203, GSM measurement may be started at the TD side as usual, and a GSM cell may be assessed.

In step 204, when it is found at the TD side that reselection toward a GSM cell is possible, the list of reselection parameter thresholds may be searched for the found GSM cell; when the found GSM cell is in the list, the flow continues by executing step 205; when the found GSM cell is not in the list, the flow continues by executing step 206.

In step 205, it is determined whether a parameter related to the signal of the TD cell is greater than the TddOffSet corresponding to the GSM cell; when the parameter related to the signal of the TD cell is greater than the TddOffSet corresponding to the GSM cell, the flow continues by executing step 203; otherwise when the parameter related to the signal of the TD cell is less than or no greater than the TddOffSet corresponding to the GSM cell, the flow continues by executing step 206.

In step 206, reselection from the TD cell toward the found GSM cell occurs, such that the UE camps on the found GSM cell.

In step 207, when the UE reselects to be served by a TD cell, the flow continues by executing step 201; otherwise the flow continues by executing step 206 to camp on the GSM cell.

In the flow, a storing upper limit of the list of reselection parameter thresholds may be defined. When a new element is to be inserted, it may be found that the list of reselection parameter thresholds is full, and then the oldest element may be deleted. A timer may be started for each element in the list of reselection parameter thresholds. When an existing element is inserted, the TddOffSet may be overwritten, and a timer may be restarted. When a timer expires, a corresponding element may be deleted from the list.

Figure 3:
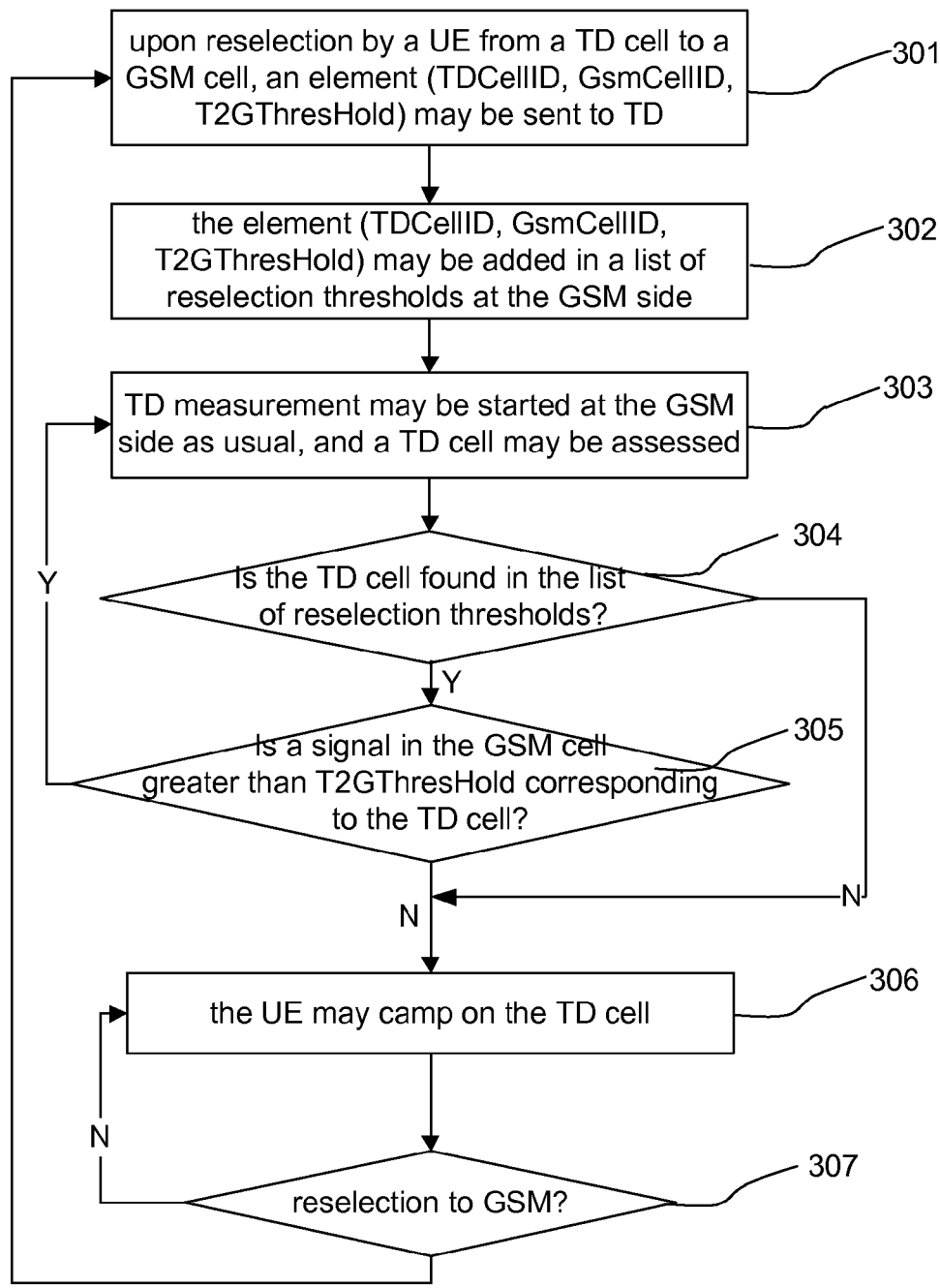
FIG. 3 is a flowchart of suppressing reselection from a GSM cell to a TD cell according to an embodiment herein.

FIG. 3 is a flowchart of suppressing reselection from a GSM cell to a TD cell according to an embodiment herein. As shown in FIG. 3, the GSM cell may maintain a list of reselection parameter thresholds including elements in a format of (TdCellID, GSMCellID, T2GThresHold). The TdCellID denotes the cell identifier of a TD cell.

The GSMCellID denotes the cell identifier of a GSM cell. The T2GthresHold is reselection parameter threshold (Qg−(Rg−Rt)) configured in the TD cell. The Qg is a measured parameter related to the GSM cell. The Rg is the R value of the GSM cell. The Rt is the R value of the TD cell. Assuming that a UE is camping on the TD cell, the suppressing reselection from the TD cell to the GSM cell may include steps as follows.

In step 301, upon reselection by a UE from a TD cell to a GSM cell, an element (TdCellID, GSMCellID, T2GThresHold) may be sent to the GSM cell. The TdCellID is the cell identifier of the TD cell serving the UE before the reselection.

In step 302, the element (TdCellID, GSMCellID, T2GThresHold) may be added in a list of reselection parameter thresholds at the GSM side; meanwhile, a timer is started for the element.

In step 303, TD measurement may be started at the GSM side as usual, and a TD cell may be assessed.

In step 304, when it is found in the GSM cell that reselection toward a TD cell is possible, the list of reselection parameter thresholds may be searched for the (GSMs, TDd) cell; when the (GSMs, TDd) cell is in the list, the flow continues by executing step 305; when the (GSMs, TDd) cell is not in the list, the flow continues by executing step 306

Here, search may be performed in the GSM cell for cell data in two dimensions of GSMs and TDd respectively denoting the serving GSM cell and the target TD cell.

In step 305, it is determined whether a parameter related to the signal of the GSM cell is greater than the T2GThresHold corresponding to the TD cell; when the parameter related to the signal of the GSM cell is greater than the T2GThresHold corresponding to the TD cell, the flow continues by executing step 303; otherwise when the parameter related to the signal of the GSM cell is less than or no greater than the T2GThresHold corresponding to the TD cell, the flow continues by executing step 306.

In step 306, reselection from the GSM cell toward the TD cell occurs, such that the UE camps on the TD cell.

In step 307, when the UE reselects to be served by a GSM cell, the flow continues by executing step 301; otherwise the flow continues by executing step 206 to camp on the TD cell.

In the flow, a storing upper limit of the list of reselection parameter thresholds may be defined. When a new element is to be inserted, it may be found that the list of reselection parameter thresholds is full; then the oldest element may be deleted. A timer may be started for each element in the list of reselection parameter thresholds. When an existing element is inserted, the T2GThresHold may be overwritten, and a timer may be restarted. The (TdCellID, GSMCellID) two-dimensional information may serve as a unique record identifier. When a timer expires, a corresponding element may be deleted from the list.

Figure 4:
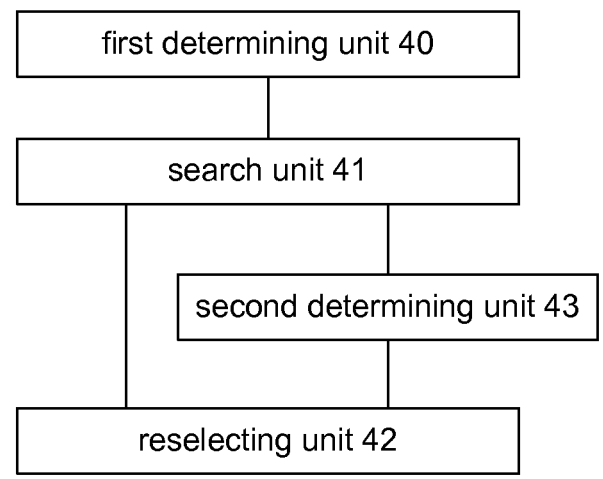
FIG. 4 is a schematic diagram of a structure of an apparatus for cell reselection according to an embodiment herein.

FIG. 4 is a schematic diagram of a structure of an apparatus for cell reselection according to an embodiment herein. As shown in FIG. 4, an apparatus for cell reselection according to an embodiment herein may include a first determining unit 40, a search unit 41, a reselecting unit 42, and a second determining unit 43.

The first determining unit 40 is configured for: determining whether a User Equipment UE being served in a source cell meets an initial reselection condition for reselecting to be served in a target cell; when the UE being served in the source cell meets the initial reselection condition for reselecting to be served in the target cell, triggering the search unit 41.

The search unit 41 is configured for: locally searching for a source cell reselection parameter threshold for a UE being served in the target cell to reselect to be served in the source cell; when there is no such threshold, triggering the reselecting unit 42; when there is such a threshold, triggering the second determining unit 43.

the reselecting unit 42 is configured for: allowing the UE being served in the source cell to reselect to be served in the target cell.

The second determining unit 43 is configured for: determining whether a source cell reselection parameter corresponding to the source cell reselection parameter threshold measured for the source cell by the UE is less than or no greater than the source cell reselection parameter threshold; when the source cell reselection parameter is less than or no greater than the source cell reselection parameter threshold, triggering the reselecting unit 42 to allow the UE being served in the source cell to reselect to be served in the target cell.

Based on an apparatus for cell reselection according to an embodiment herein as shown in FIG. 4, an apparatus for cell reselection according to an embodiment herein may further include:

a notification unit (not shown in FIG. 4), which may be configured for: when the reselecting unit 42 enables the UE being served in the source cell to reselect to be served in the target cell, notifying the target cell of a target cell reselection parameter threshold for the UE being served in the source cell to reselect to be served in the target cell.

The initial reselection condition may include a protocoled reselection condition.

The source cell and the target cell may belong respectively to different communication systems.

The source cell reselection parameter threshold may include at least one of a Signal-to-Noise Ratio SNR and a received power of a wireless signal.

The source cell and the target cell may belong respectively to the TD-SCDMA system and the GSM.

The notification unit may further be configured for: when the source cell is a GSM cell and the target cell is a TD-SCDMA system cell, notifying the target cell of a source cell identifier and a target cell reselection parameter threshold.

Or the notification unit may further be configured for: when the source cell is a TD-SCDMA system cell and the target cell is a GSM cell, notifying the target cell of a source cell identifier, a target cell identifier, and a target cell reselection parameter threshold.

The apparatus for cell reselection may apply to a BS. Any of the first determining unit 40, the search unit 41, the reselecting unit 42, and the second determining unit 43 may be implemented using a Central Processing Unit CPU, a Digital Signal Processor DSP, or a Field Programmable Gate Array FPGA set in a BS. The notification unit may be implemented using an antenna set in a BS or a corresponding wired or wireless network port.

Those skilled in the art will understand that functions implemented by processing units in the apparatus for cell reselection shown in FIG. 4 may be understood with reference to description of the method for cell reselection. Those skilled in the art will understand that a function of a processing unit in the apparatus for cell reselection shown in FIG. 4 may be implemented by a program running on a processor or by a specific logic circuit.

An embodiment herein further discloses a BS, which may include the apparatus for cell reselection shown in FIG. 4. The BS according to an embodiment herein in particular may refer to a GSM BS and/or a TD-SCDMA system BS.

Apparently, those skilled in the art will know that processing units or steps in embodiments herein may be realized using a universal computing device, and may be integrated in a single computing device or distributed in a network formed by multiple computing devices. Optionally, they may be realized using computing device executable program codes, and thus may be stored in a storage device and executed by a computing device. Each unit may be made into an Integrated Circuit module. Multiple modules or steps herein may be realized by being made into a single Integrated Circuit module. Thus, an embodiment of the disclosure is not limited to a specific combination of hardware and software.

What described are merely embodiments of the disclosure and are not intended to limit the scope of the disclosure.

INDUSTRIAL APPLICABILITY

With the disclosure, a target cell may be notified of a reselection parameter threshold used in reselection to the target cell by a US from a source cell, such that before reselection toward the source cell by the UE from the target cell, it may be further determined whether to carry out the reselection toward the source cell according to the reselection parameter threshold for reselection to the target cell. With a technical solution herein, asymmetric strategies for reselection between a TD-SCDMA system cell (TD cell for short) and a GSM cell, avoiding Ping-Pong reselection between the TD cell and the GSM cell, shortening UE paging interruption time during reselection, reducing a network load, enabling UE energy saving.

The invention claimed is:

1. A method for cell reselection, comprising:
when determining that a User Equipment UE being served in a source cell meets an initial reselection condition for reselecting to be served in a target cell, locally searching for a source cell reselection parameter threshold for a UE being served in the target cell to reselect to be served in the source cell; when there is no such threshold, allowing the UE being served in the source cell to reselect to be served in the target cell; when there is such a threshold, further determining whether a source cell reselection parameter corresponding to the source cell reselection parameter threshold measured for the source cell by the UE is less than or no greater than the source cell reselection parameter threshold; when the source cell reselection parameter is less than or no greater than the source cell reselection parameter threshold, allowing the UE being served in the source cell to reselect to be served in the target cell.

2. The method according to claim 1, further comprising:
in allowing the UE being served in the source cell to reselect to be served in the target cell, notifying the target cell of a target cell reselection parameter threshold for the UE being served in the source cell to reselect to be served in the target cell.

3. The method according to claim 1, wherein the initial reselection condition comprises a protocoled reselection condition.

4. The method according to claim 1, wherein the source cell and the target cell belong respectively to different communication systems.

5. The method according to claim 4, wherein the source cell and the target cell belong respectively to a Time Division-Synchronous Code Division Multiple Access TD-SCDMA system and a Global System of Mobile communication GSM;
when the source cell is a GSM cell and the target cell is a TD-SCDMA system cell, the target cell is notified of a source cell identifier and a target cell reselection parameter threshold;
when the source cell is a TD-SCDMA system cell and the target cell is a GSM cell, the target cell is notified of a source cell identifier, a target cell identifier, and a target cell reselection parameter threshold.

6. The method according to claim 4, wherein the source cell reselection parameter threshold comprises at least one of a Signal-to-Noise Ratio SNR and a received power of a wireless signal.

7. An apparatus for cell reselection, comprising a first determining unit, a search unit, a reselecting unit, and a second determining unit, wherein
the first determining unit is configured for: determining whether a User Equipment UE being served in a source cell meets an initial reselection condition for reselecting to be served in a target cell; when the UE being served in the source cell meets the initial reselection condition for reselecting to be served in the target cell, triggering the search unit;
the search unit is configured for: locally searching for a source cell reselection parameter threshold for a UE being served in the target cell to reselect to be served in the source cell; when there is no such threshold, triggering the reselecting unit; when there is such a threshold, triggering the second determining unit;
the reselecting unit is configured for: allowing the UE being served in the source cell to reselect to be served in the target cell;
the second determining unit is configured for: determining whether a source cell reselection parameter corresponding to the source cell reselection parameter threshold measured for the source cell by the UE is less than or no greater than the source cell reselection parameter threshold; when the source cell reselection parameter is less than or no greater than the source cell reselection parameter threshold, triggering the reselecting unit to allow the UE being served in the source cell to reselect to be served in the target cell.

8. The apparatus according to claim 7, further comprising:
a notification unit configured for: when the reselecting unit allows the UE being served in the source cell to reselect to be served in the target cell, notifying the target cell of a target cell reselection parameter threshold for the UE being served in the source cell to reselect to be served in the target cell.

9. The apparatus according to claim 7, wherein the initial reselection condition comprises a protocoled reselection condition.

10. The apparatus according to claim 7, wherein the source cell and the target cell belong respectively to different communication systems;
the source cell reselection parameter threshold comprises at least one of a Signal-to-Noise Ratio SNR and a received power of a wireless signal.

11. The apparatus according to claim 10, wherein the source cell and the target cell belong respectively to a Time Division-Synchronous Code Division Multiple Access TD-SCDMA system and a Global System of Mobile communication GSM;
the notification unit is further configured for: when the source cell is a GSM cell and the target cell is a TD-SCDMA system cell, notifying the target cell of a source cell identifier and a target cell reselection parameter threshold;
or the notification unit is further configured for: when the source cell is a TD-SCDMA system cell and the target cell is a GSM cell, notifying the target cell of a source cell identifier, a target cell identifier, and a target cell reselection parameter threshold.

12. A base station BS, comprising the apparatus for cell reselection according to claim 7.

* * * * *